United States Patent
Johansen et al.

(10) Patent No.: US 8,276,987 B1
(45) Date of Patent: Oct. 2, 2012

(54) CHILDREN'S TRICYCLE WITH ADAPTABLE SEAT

(75) Inventors: Jesper Bruhn Johansen, Roskilde (DK); Lars Mathiesen, Frederiksberg (DK)

(73) Assignee: Excelligence Learning Corporation, Monterey, CA (US)

( * ) Notice: Subject to any disclaimer, the term of this patent is extended or adjusted under 35 U.S.C. 154(b) by 291 days.

(21) Appl. No.: 12/627,665

(22) Filed: Nov. 30, 2009

(51) Int. Cl.
*B60N 2/40* (2006.01)

(52) U.S. Cl. ..................... 297/195.1; 280/282

(58) Field of Classification Search ............... 297/195.1; 280/282

See application file for complete search history.

(56) References Cited

U.S. PATENT DOCUMENTS

| 3,116,073 | A | | 12/1963 | Ott |
| 3,771,827 | A | * | 11/1973 | Winfree ................ 297/188.08 |
| 4,079,957 | A | | 3/1978 | Blease |
| 4,625,986 | A | | 12/1986 | Kassai |
| 7,455,308 | B2 | | 11/2008 | Michelau et al. |
| 7,568,720 | B2 | | 8/2009 | Golias |
| 2003/0230869 | A1 | * | 12/2003 | Beresnitzky et al. ......... 280/282 |

* cited by examiner

*Primary Examiner* — Kevin Hurley
(74) *Attorney, Agent, or Firm* — Haverstock & Owens LLP

(57) ABSTRACT

A children's tricycle comprises a frame, a set of handlebars, a fork, three wheels and a seat adaptable for users of different sizes without modification. The frame comprises a top tube, a head tube and a rear triangle that is substantially perpendicular to the top tube. In some embodiments, the seat extends from the head tube to a point on the frame. In some embodiments, the seat extends from a pivot point of the tricycle along the top tube to the rear triangle. Accordingly, to utilize the tricycle, different sized users are able to move forward or backward on the seat to comfortably engage the pedals and handlebars of the tricycle. In some embodiments, the frame of the children's tricycle comprises one or more of steel, aluminum and metal composite.

12 Claims, 4 Drawing Sheets

CHILDREN'S TRICYCLE WITH ADAPTABLE SEAT

FIELD OF THE INVENTION

This invention relates generally to children's tricycles and tricycle seats. More specifically, this invention relates to children's tricycles designed to accommodate riders of varying ages and sizes without modification.

BACKGROUND OF THE INVENTION

Tricycles and riding toys provide children with exercise and enjoyment. Consequently, they are very popular. Children's tricycles are generally manufactured from steel or plastic and are available in a variety of configurations. However, the distance between the seat and the pedals is typically fixed such that only a user of a specified height is able to comfortably operate the tricycle. Particularly, a user is not able to move closer or further from the pedals by varying their position on the seat. Consequently, the seat and pedals must be adjusted or an additional toy must be purchased in order to accommodate a different family member or a differently sized user.

SUMMARY OF THE INVENTION

A children's tricycle comprises a frame, a set of handlebars, a fork, three wheels and a seat adaptable for users of different sizes without modification. The frame comprises a top tube, a head tube and a rear triangle that is substantially perpendicular to the top tube. In some embodiments, the seat extends from the head tube to a point on the frame. In some embodiments, the seat extends from a pivot point of the tricycle along the top tube to the rear triangle. Accordingly, to utilize the tricycle, different sized users are able to move forward or backward on the seat to comfortably engage the pedals and handlebars of the tricycle. In some embodiments, the frame of the children's tricycle comprises one or more of steel, aluminum and metal composite.

In one aspect a children's tricycle comprises a frame comprising a top tube, a head tube, and one or more rear frame tubes, a set of handlebars, a fork, three wheels and a seat extending from the head tube to a position on the frame. In some embodiments, the one or more rear frame tubes comprise a rear triangle. In some embodiments, the rear triangle is substantially perpendicular to the top tube. In some embodiments, the frame comprises one or more of steel aluminum and metal composite. The three wheels comprise a front wheel coupled to the fork, and two rear wheels coupled to the one or more frame tubes. In some embodiments, the rear wheels are coupled to the rear triangle.

In some embodiments, the fork and handlebars are integrally connected through a center portion. In some embodiments, the head tube of the frame couples with the set of handlebars and the fork at the center portion. In some embodiments, the seat couples with the head tube, the set of handlebars and the fork at the center portion. In some embodiments, the center portion is a pivot point of the handlebars and fork with respect to the frame. In still further embodiments, the seat extends from the head tube along the top tube to the one or more rear frame tubes. In some embodiments, the seat comprises an elevated back support. In some embodiments the seat comprises one or more of rubber, foam, leather and plastic.

In another aspect, a children's riding toy comprises a frame, a handlebar section, a fork section, three wheels and a seat extending from a middle of the handlebar section and the fork section. The frame comprises a head tube, a top tube, and a rear triangle, perpendicular to the top tube. In some embodiments, the seat extends from the middle of the handlebar section and the fork section to the rear triangle. In some embodiments, the middle of handlebar section and the fork section is a pivot point of the frame, handlebar section and fork section. In some embodiments, the frame comprises one or more of steel, aluminum and metal composite.

In some embodiments, the seat of the children's riding toy comprises a back support and a front. In some of these embodiments, the front of the seat is configured to fit over the head tube of the frame. In some embodiments, the seat is configured to couple to a children's riding toy at the pivot point. In further embodiments, the front of the seat comprises a circular aperture for receiving a securing device to secure the seat with the head tube. In some embodiments, the seat comprises one or more of rubber, foam, leather and plastic.

In yet another aspect, a children's tricycle seat is adaptable for users of multiple sizes without modification. In this aspect, a children's tricycle seat comprises two sides, a front and an elevated back support, wherein the width of the seat decreases as the seat transitions from the back support to the front. In some embodiments, the front is configured to attach at a pivot point of a children's tricycle. In some embodiments, the two sides comprise a near face and an opposite face. In these embodiments, the near face and the opposite face increase in size as the width of the seat decreases and the seat transitions from the elevated back support to the front. In some embodiments, the front of the seat is configured to fit over a head tube of a children's tricycle frame. In some of these embodiments, the front further comprises a circular aperture for receiving a securing device to secure the children's tricycle seat with the head tube. In some embodiments, the seat is configured to attach to a children's tricycle at a pivot point of the tricycle. In some embodiments, the children's tricycle seat comprises one or more of rubber, foam, leather and plastic.

DETAILED DESCRIPTION

Figure 1:
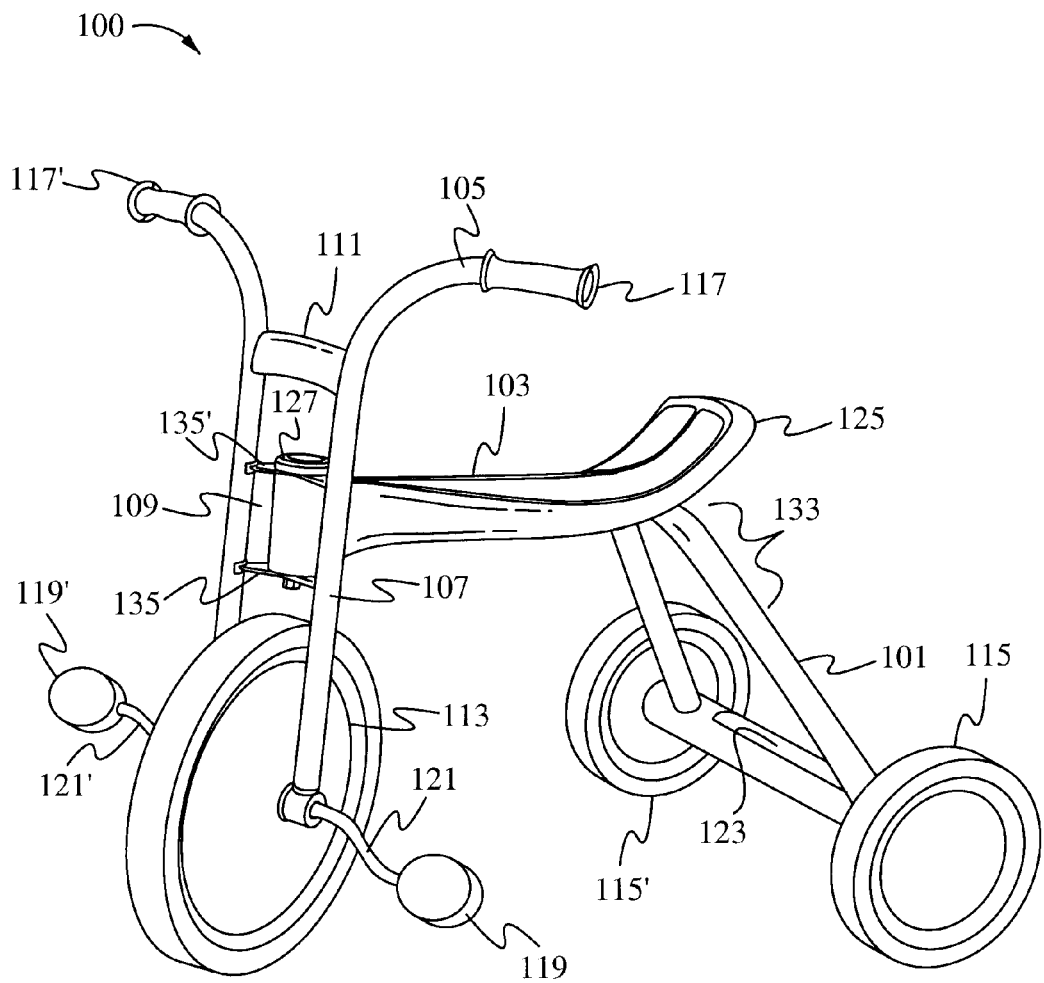
FIG. 1 illustrates a children's tricycle in accordance with some embodiments.

Referring now to FIG. 1, a children's tricycle is depicted therein. A children's tricycle 100 comprises a frame 101, a set of handlebars 105, a fork 107, three wheels 113, 115 and 115', a set of pedals 119 and 119', and a seat 103. The frame comprises a horizontal top tube 229 (FIG. 2), a head tube 231 (FIG. 2), and a rear triangle 133. The rear triangle 133 is substantially perpendicular to the horizontal top tube 229. In some embodiments, the rear triangle 133 comprises one or more rear frame tubes. The set of handlebars 105 comprises a plurality of hand grips 117, 117' and a stabilizing bar 111. The set of handlebars 105 is continuously connected to the fork 107 by a center portion 109. The center portion 109 comprises a set of mounting brackets 135 and 135'. In some embodiments, the hand grips 117 and 117' comprise one or more of rubber, foam, plastic or other appropriate material as known in the art. The seat 103 extends along the length of the frame 101 and comprises a front portion 127 and a back support 125. In some embodiments, the back support 125 extends to or just beyond the rear triangle 133 and curves in an upward direction. In some embodiments, the seat 103 extends from the center portion 109 rearward along the top tube 229 to the rear triangle 133. In some embodiments, the seat comprises one or more of rubber, foam, leather, plastic or other appropriate material as known in the art.

The mounting brackets 135 and 135' couple the head tube 231 and the frame 101 to the middle section 109 by any appropriate mechanism as known in the art. For example, in some embodiments, the head tube 231 is coupled to the middle section 109 by one or more of a bolt, screw or other appropriate mechanism. When the head tube 231 is coupled to the middle section 109 a user is able to vary the orientation of the fork 107 relative to the frame 101 by turning the handlebars 105. In some embodiments, the seat 103 is additionally coupled to the middle section 109 at the mounting brackets 135 and 135'. When the frame 101 is coupled to the middle section 109, the middle section 109 comprises the pivot point of the frame 101, handlebars 105 and fork 107. In some embodiments, the seat 103 couples to the tricycle 100 at the pivot point. In some embodiments, the seat 103 extends from the pivot point to the rear triangle 133. Accordingly, a smaller user is able to sit close to the pivot point on the front of the seat 127 and comfortably reach the pedals 119 and 119' while a larger user is able to sit close to the rear triangle 133 on the back of the seat and also comfortably reach the pedals 119 and 119'.

As further shown in FIG. 1, the children's tricycle comprises a front wheel 113 and a pair of rear wheels 115 and 115'. The front wheel 113 is connected to the fork 107 and the rear wheels 115 and 115' are connected to corners of the rear triangle 133. Particularly, the front wheel 113 and the rear wheels 115 and 115' are connected to the children's tricycle by any appropriate mechanism as known in the art. A horizontal frame tube 123 of the rear triangle 133 connects the rear wheels 115 and 115'. In some embodiments, the frame tube 123 is covered in a non-slip material such as rubber, plastic or foam.

Additionally coupled to the front wheel 113 is a pair of crank arms 121 and 121' and pedals 119 and 119'. The pedals 119 and 119' and crank arms 121 and 121' enable a user to spin the front wheel 113 and move the children's tricycle 100 forward when the pedals 119 and 119' are depressed. The front wheel 113 is moved to the left or right by turning the handlebars 105.

Figure 2:
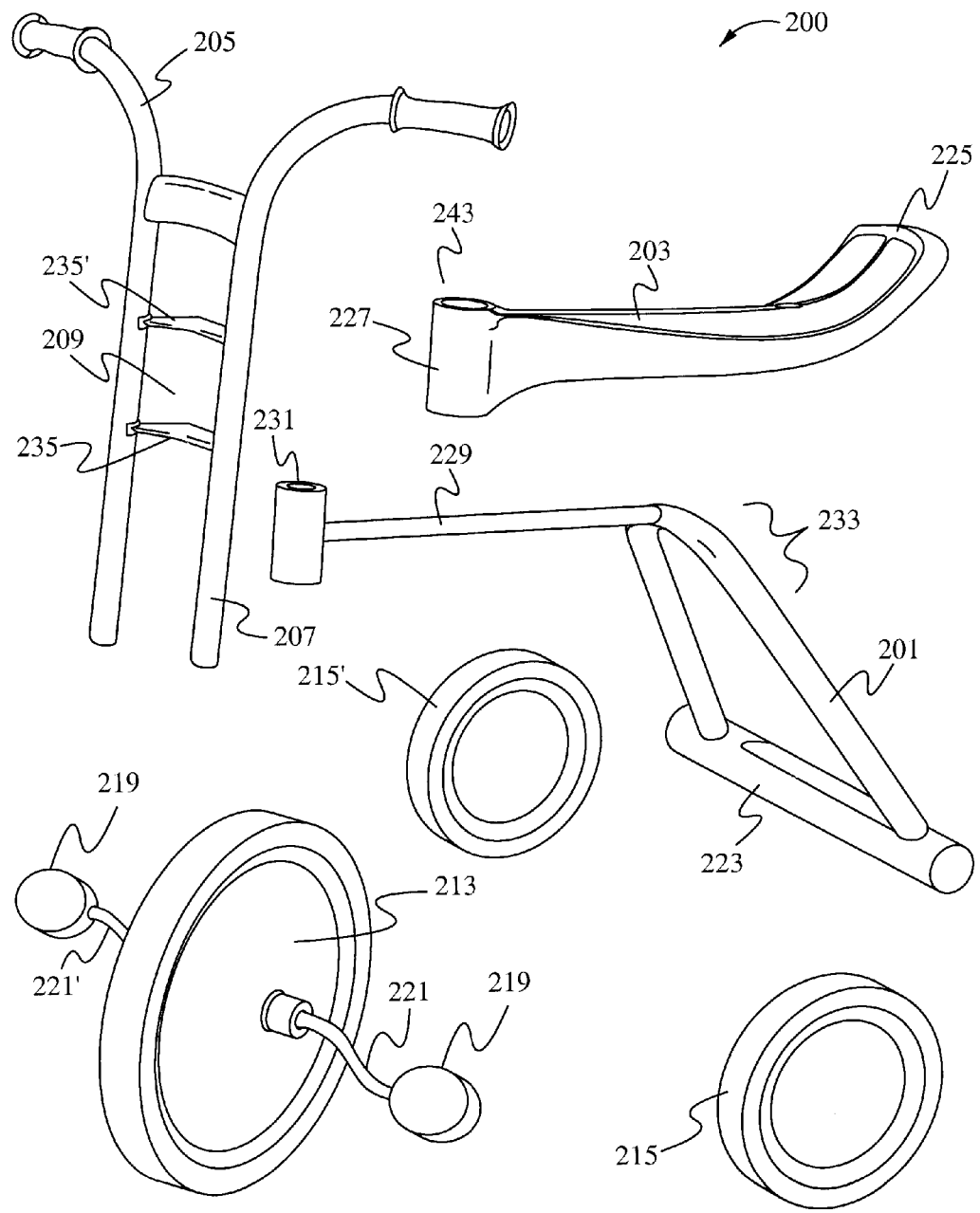
FIG. 2 illustrates an exploded view of a children's tricycle in accordance with some embodiments.

Referring now to FIG. 2, an exploded view of a children's riding toy 200 in accordance with some embodiments is depicted therein. As shown in FIG. 2, a children's riding toy 200 comprises a frame 201, a handlebar section 205 connected to a fork section 207 by a center section 209, three wheels 213, 215 and 215' and a seat 203. The frame 201 comprises a horizontal top tube 229, a head tube 231 and a rear triangle 233. The rear triangle 233 is substantially perpendicular to the horizontal top tube 229. The head tube 231 comprises a vertically oriented hollow cylinder substantially perpendicular to the horizontal top tube 229.

The handlebar section 205 is connected to the fork section 207 by a center section 209. The center section 209 further comprises a pair of mounting brackets 235 and 235' for connecting the center section 209 with the head tube 231. When the center section 209 is connected to the head tube 231, the center section 209 comprises a pivot point of the children's riding toy 200. The seat 203 comprises a front 227 and an elevated back support 225. In some embodiments, the seat 203 starts at the pivot point, connects along the length of the horizontal top tube 229 and ends at the rear triangle 233. In some embodiments, the seat 203 runs the length of the horizontal top tube 229 from the head tube 231 to the rear triangle 233. In some embodiments, the front of the seat 227 fits over the head tube 231. In some embodiments, the front of the seat 227 comprises a circular aperture 243. In some embodiments, the front of the seat 227 and the head tube 231 couple with the mounting brackets 235 and 235'. In some embodiments, the front of the seat 227 and head tube 231 couple with the mounting brackets by a nut and bolt or screw. In some embodiments, the front of the seat 227 and head tube 231 couple with the mounting brackets 235 and 235' by any other appropriate method as known in the art. Accordingly, the fork section 207 is moved relative to the horizontal top tube 229 by turning the handlebar section 205.

With the front of the seat 227 starting at the center section 209 and connecting along the horizontal top tube 229 to the rear triangle 233 multiple users of different sizes are able to use the children's riding toy without modification. For example, a small user relative to the size of the riding toy 200 is able to sit on the seat 203 close to the center section 209 in order to comfortably engage the pedals 219 and 219' and the handlebars 205. Alternatively, a larger user relative to the size of the riding toy 200 is able to sit farther back on the seat 203, close to the rear triangle 233 in order to comfortably reach the pedals 219 and 219' and handlebars 205.

As further shown in FIG. 2, the children's riding toy 200 comprises a front wheel 213 connected to the fork section 207 and two rear wheels 215 and 215' connected to the rear triangle 233. The two rear wheels 215 and 215' are connected to the rear triangle 233 by any appropriate method as known in the art. The rear triangle 233 comprises a horizontal frame tube 223 which runs between the rear wheels 215 and 215'.

A set of pedals 219 and 219' are connected to the front wheel 213 by a set of crank arms 221 and 221'. The pedals 219 and 219' are rotated in a forward direction to move the front wheel 213 and the children's riding toy forward 200.

Figure 3:
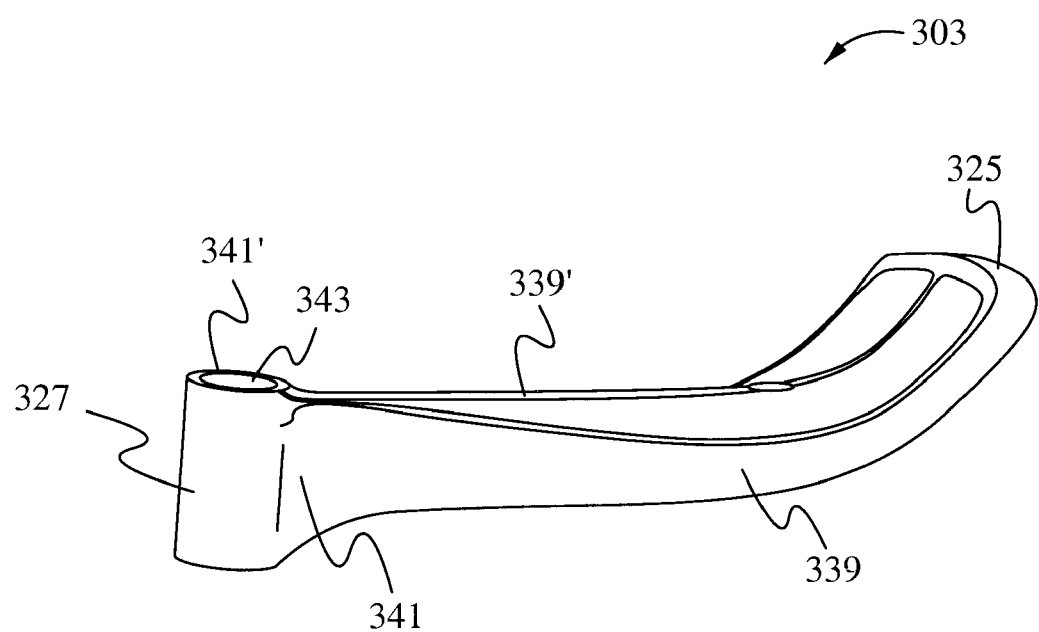
FIG. 3 illustrates a children's tricycle seat in accordance with some embodiments.

FIG. 3 illustrates a close-up view of a seat 303 for a children's tricycle in accordance with some embodiments. As shown in FIG. 3, the seat 303 is adaptable for users of multiple sizes without modification. The seat 303 comprises a front 327 and an elevated back support 325. As the seat 303 transitions from the elevated back support 325 to the front 327, a near side 339 and an opposite side 339' of the seat gradually narrow toward the front portion 327 forming a near face 341 and an opposite face 341'. As shown in FIG. 3, the near face 341 and the opposite face 341' are on a left side and a right side of the seat. The transition of the front near side 339 and the opposite side 339' enables a user to move forward and backward on the seat 303 and comfortably engage the pedals 319 and 319' and handlebars 305 from any position on the seat 303. As further shown in FIG. 3, the front of the seat 327 comprises a circular aperture 343. In some embodiments, the front of the seat 327 is configured to attach to a children's tricycle at the pivot of the tricycle.

Figure 4:
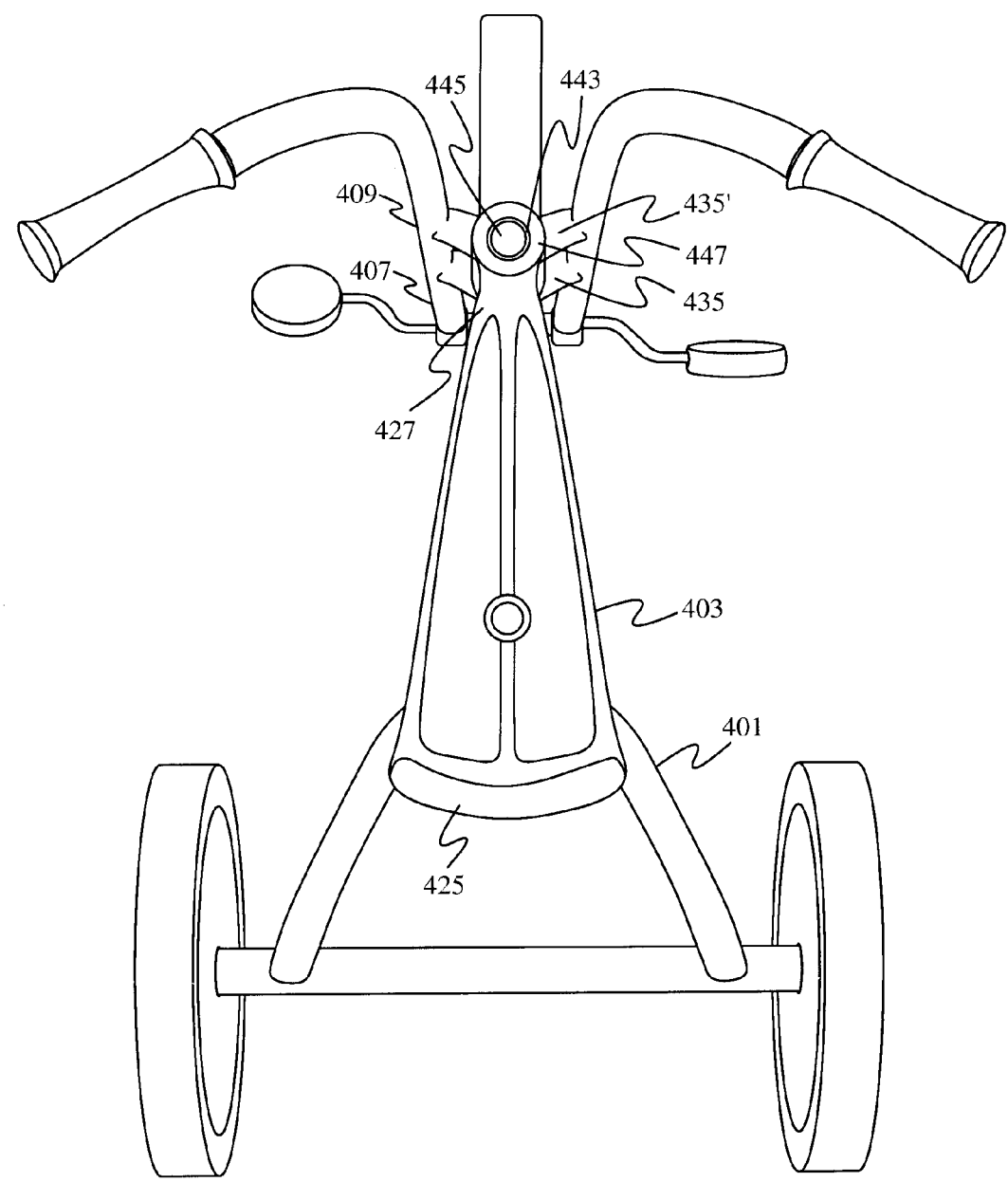
FIG. 4 illustrates a top view of a children's tricycle seat and children's tricycle in accordance with some embodiments.

FIG. 4 illustrates a close-up top view of a seat 403 connected to a children's tricycle in accordance with some embodiments. The seat 403 comprises a front 427 and an elevated back support 425. As shown in FIG. 4, the seat 403 is coupled to a center section 409 between the fork 407 and the handlebars (not shown). The width of the seat 403 decreases as the seat 403 transitions from the back support 425 to the front 427. In some embodiments, the seat comprises one or more of rubber, foam, leather and plastic. In some embodiments, the seat comprises another appropriate material as known in the art.

The front of the seat 427 comprises a circular aperture 443 for receiving a securing device 445. The securing device 445, secures the head tube (not shown) with the mounting brackets 435 and 435'. In some embodiments, the securing device 445 also secures the front of the seat 427 with the head tube and the mounting brackets 435 and 435'. In some embodiments the front of the seat 427 and head tube are secured to the mounting brackets 435 and 435' by a bolt and screw. In some embodiments the seat 403 and head tube are secured to the mounting brackets 435 and 435' by another appropriate mechanism as known in the art. When the front of the seat 427 is secured with the head tube and the mounting brackets 435 and 435' the front of the seat comprises the pivot point of the tricycle. In some embodiments, a protective gasket 447 covers the securing device 445. The protective gasket 447 extends above the securing device and prevents a body part of a user from contacting the securing device 445. When the head tube and the front of the seat 427 are coupled with the mounting brackets 435 and 435', the securing device 445 enables a user to rotate the fork 407 and front wheel relative to the head tube and the seat 403 with the handlebars. In some embodiments, the seat 403 begins at the middle section 409 and extends along the head tube to just beyond the rear triangle 433.

In operation, the children's tricycle provides exercise and enjoyment for riders of different ages and sizes. The configuration of the seat enables riders of various ages and sizes to use a children's tricycle without modification. For example, a smaller user is able to sit on the seat close to the pivot point of the tricycle in order to comfortably engage the pedals and the handlebars. Alternatively, a larger user is able to sit on the seat close to the rear triangle of the tricycle in order to comfortably engage the pedals and the handlebars. Accordingly, as the size of a user increases relative to the tricycle, the user is able to move back on the seat and increase the distance between the user and the pedals and the handlebars. Additionally, the metal frame of the tricycle is resilient and is able to withstand repeated use by many different users. Thus, the children's tricycle has many advantages.

The invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications area able to be made in the embodiment chosen for illustration without departing from the spirit and scope of the invention. Accordingly, the device of the invention is able to be implemented in several different ways and have several different appearances.

We claim:

1. A children's tricycle seat, adaptable for users of multiple sizes without modification, comprising:
   a. two sides;
   b. a front configured to attach at a pivot point of a children's tricycle; and
   c. an undivided, elevated back support, wherein a width of the seat decreases as the seat transitions from the back support to the front;
wherein the two sides comprise a near face and an opposite face, wherein the near face and the opposite face increase in size as the width of the seat decreases and the seat transitions from the elevated back support to the front.

2. The children's tricycle seat of claim 1 wherein the front is configured to fit over a head tube of a children's tricycle frame.

3. The children's tricycle seat of claim 2 wherein the front further comprises a circular aperture for receiving a securing device to secure the children's tricycle seat with the head tube.

4. The children's tricycle seat of claim 1 wherein the seat comprises one or more of rubber, foam, leather and plastic.

5. A children's tricycle seat, adaptable for users of multiple sizes without modification, comprising:
   a. two sides;
   b. a front configured to attach at a pivot point of a children's tricycle; and
   c. an elevated back support, wherein a width of the seat decreases as the seat transitions from the back support to the front,
wherein the two sides comprise a near face and an opposite face, wherein the near face and the opposite face increase in size as the width of the seat decreases and the seat transitions from the elevated back support to the front.

6. The children's tricycle seat of claim 5 wherein the front is configured to fit over a head tube of a children's tricycle frame.

7. The children's tricycle seat of claim 6 wherein the front further comprises a circular aperture for receiving a securing device to secure the children's tricycle seat with the head tube.

8. The children's tricycle seat of claim 5 wherein the seat comprises one or more of rubber, foam, leather and plastic.

9. A children's tricycle seat, adaptable for users of multiple sizes without modification, comprising:
   a. two sides;
   b. a front configured to attach at a pivot point of a children's tricycle; and
   c. an undivided back support, wherein a width of the seat decreases as the seat transitions from the undivided back support to the front
wherein the two sides comprise a near face and an opposite face, wherein the near face and the opposite face increase in size as the width of the seat decreases and the seat transitions from the elevated back support to the front.

10. The children's tricycle seat of claim 9 wherein the front is configured to fit over a head tube of a children's tricycle frame.

11. The children's tricycle seat of claim 10 wherein the front further comprises a circular aperture for receiving a securing device to secure the children's tricycle seat with the head tube.

12. The children's tricycle seat of claim 9 wherein the seat comprises one or more of rubber, foam, leather and plastic.

* * * * *